(12) United States Patent
Xie et al.

(10) Patent No.: US 9,617,165 B1
(45) Date of Patent: Apr. 11, 2017

(54) METHOD FOR MAKING MOLECULAR SIEVE SSZ-105

(71) Applicant: Chevron U.S.A. Inc., San Ramon, CA (US)

(72) Inventors: Dan Xie, Richmond, CA (US); Christopher Michael Lew, Richmond, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 75 days.

(21) Appl. No.: 14/884,859

(22) Filed: Oct. 16, 2015

(51) Int. Cl.
| C01B 39/02 | (2006.01) |
| B01J 29/06 | (2006.01) |
| C01B 39/48 | (2006.01) |
| C01B 39/30 | (2006.01) |
| B01J 29/50 | (2006.01) |
| B01J 29/70 | (2006.01) |

(52) U.S. Cl.
CPC .............. *C01B 39/48* (2013.01); *B01J 29/50* (2013.01); *B01J 29/70* (2013.01); *C01B 39/023* (2013.01); *C01B 39/30* (2013.01); *C01B 39/305* (2013.01); *B01J 2029/062* (2013.01)

(58) Field of Classification Search
CPC ..... C01B 39/023; C01B 39/30; C01B 39/305; C01B 39/48; B01J 29/50; B01J 29/70; B01J 2029/062
See application file for complete search history.

(56) References Cited

PUBLICATIONS

Wise eta l, "The chemical compositions and orignins fo the zeolites offretite, erionite, and levyne", American Mineralogist, vol. 61, pp. 853-863, (1976).*
Passsaglia et al. "Crystal chemistry of the zeolites erionite and offretite", American Mineralogist, vol. 83, pp. 577-589, (1998).*
M.M.J. Treacy, J.M. Newsam and M.W. Deem "A general recursion method for calculating diffracted intensities from crystals containing planar faults" Proc. R. Soc. Lond. A 1991, 433, 499-520.
R. Szostak "Molecular Sieves Principles of Synthesis and Identification" Second Edition, Blackie Academic & Professional, London, 62-76 (1998).

* cited by examiner

*Primary Examiner* — David M Brunsman
(74) *Attorney, Agent, or Firm* — Terence M. Flaherty

(57) ABSTRACT

A method for making a new crystalline molecular sieve designated SSZ-105 is disclosed. SSZ-105 is synthesized using N,N-dimethylpiperidinium cations as a structure directing agent. SSZ-105 is a disordered aluminosilicate molecular sieve comprising at least one intergrown phase of an ERI framework type molecular sieve and an LEV framework type molecular sieve.

7 Claims, 11 Drawing Sheets

METHOD FOR MAKING MOLECULAR SIEVE SSZ-105

TECHNICAL FIELD

This disclosure relates to a new crystalline molecular sieve designated SSZ-105, a method for preparing SSZ-105, and uses for SSZ-105. SSZ-105 is a disordered aluminosilicate molecular sieve comprising at least one intergrown phase of an ERI framework type molecular sieve and an LEV framework type molecular sieve.

BACKGROUND

Molecular sieve materials, both natural and synthetic, have been demonstrated in the past to be useful as adsorbents and to have catalytic properties for various types of organic conversion reactions. Certain molecular sieves, such as zeolites, aluminophosphates, and mesoporous materials, are ordered, porous crystalline materials having a definite crystalline structure as determined by X-ray diffraction. Within the crystalline molecular sieve material there are a large number of cavities which may be interconnected by a number of channels or pores. These cavities and pores are uniform in size within a specific molecular sieve material. Because the dimensions of these pores are such as to accept for adsorption molecules of certain dimensions while rejecting those of larger dimensions, these materials have come to be known as "molecular sieves" and are utilized in a variety of industrial processes.

Although many different crystalline molecular sieves have been discovered, there is a continuing need for new molecular sieves with desirable properties for gas separation and drying, organic conversion reactions, and other applications. New molecular sieves can contain novel internal pore architectures, providing enhanced selectivities in these processes.

Molecular sieves are classified by the Structure Commission of the International Zeolite Association according to the rules of the IUPAC Commission on Zeolite Nomenclature. According to this classification, framework type zeolites and other crystalline microporous molecular sieves, for which a structure has been established, are assigned a three letter code and are described in the "*Atlas of Zeolite Framework Types*," Sixth Revised Edition, Elsevier, 2007.

Molecular sieves may be ordered or disordered. Ordered molecular sieves are built from structurally invariant building units, called Period Building Units (PerBUs), and are periodically ordered in three dimensions. Crystal structures built from PerBUs are called end-member structures if periodic ordering is achieved in all three dimensions. Disordered structures, on the other hand, show periodic ordering in less than three dimensions. One such disordered structure is a disordered planar intergrowth in which the building units from more than one framework type are present. Such intergrowths frequently have significantly different catalytic properties from their end members. For example, zeolite ZSM-34 is well known intergrowth of ERI and OFF framework types and exhibits a methanol-to-olefins performance superior to that of its individual component materials.

Disclosed herein is a unique disordered aluminosilicate molecular sieve designated SSZ-105 which comprises at least one intergrown phase of an ERI framework type molecular sieve and an LEV framework type molecular sieve.

SUMMARY

The present disclosure is directed to a new family of crystalline molecular sieves with unique properties, referred to herein as "molecular sieve SSZ-105" or simply "SSZ-105." Molecular sieve SSZ-105 comprises at least one intergrown phase of an ERI framework type molecular sieve and an LEV framework type molecular sieve.

In its calcined form, molecular sieve SSZ-105 has a chemical composition, in terms of mole ratios, comprising the following:

$$Al_2O_3:(n)SiO_2$$

wherein n has a value from 10 to 50.

In one aspect, there is provided a process for preparing molecular sieve SSZ-105 by (a) preparing a reaction mixture containing: (1) at least one source of silicon oxide; (2) at least one source of aluminum oxide; (3) at least one source of a Group 1 metal (M), wherein M is selected from the group consisting of potassium and combinations of sodium and potassium; (4) hydroxide ions; (5) N,N-dimethylpiperidinium cations; and (6) water; and (b) subjecting the reaction mixture to crystallization conditions sufficient to form crystals of the molecular sieve.

In its as-synthesized and anhydrous form, molecular sieve SSZ-105 has a chemical composition, in terms of mole ratios, comprising the following:

|  | Broad | Exemplary |
| --- | --- | --- |
| $SiO_2/Al_2O_3$ | 10 to 50 | 15 to 40 |
| $Q/SiO_2$ | 0.02 to 0.20 | 0.05 to 0.20 |
| $M/SiO_2$ | 0.01 to 0.20 | 0.02 to 0.15 | wherein Q comprises N,N-dimethylpiperidinium cations and M is a Group 1 metal selected from the group consisting of potassium and combinations of sodium and potassium.

Additionally, the molecular sieve disclosed herein is useful in a wide range of processes, including separation processes and as a catalyst in organic conversion reactions. In further aspect, there is disclosed a process for converting a feedstock comprising an organic compound to a conversion product which comprises the step of contacting the feedstock with a catalyst at organic compound conversion conditions, the catalyst comprising an active form of the molecular sieve described herein.

DETAILED DESCRIPTION

Introduction

Figure 1:
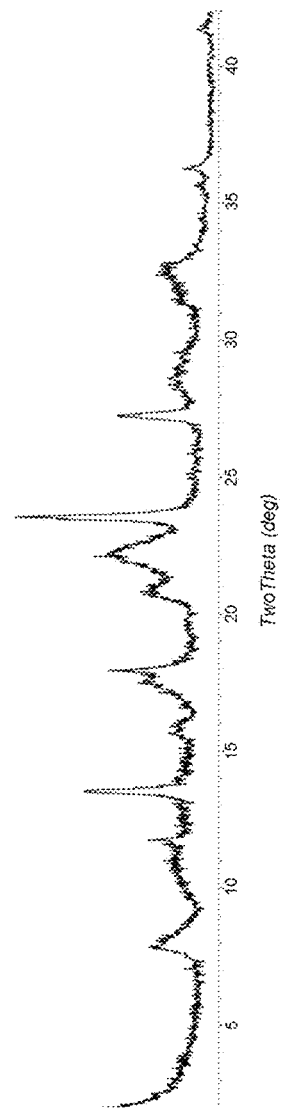
FIG. 1 is a powder X-ray diffraction (XRD) pattern of the as-synthesized molecular sieve prepared in Example 1.

The following terms will be used throughout the specification and will have the following meanings unless otherwise indicated.

The term "framework type" is used in the sense described in the "*Atlas of Zeolite Framework Types*," Sixth Revised Edition, Elsevier, 2007.

As used herein, the numbering scheme for the Periodic Table Groups is as disclosed in *Chem. Eng. News*, 63(5), 26-27 (1985).

Intergrown molecular sieve phases are disordered planar intergrowths of molecular sieve frameworks. Reference is directed to the "Catalog of Disordered Zeolite Structures," 2000 Edition, published by the Structure Commission of the International Zeolite Association and to the "*Collection of Simulated XRD Powder Patterns for Zeolites*," Fifth Revised Edition, Elsevier, 2007, published on behalf of the Structure Commission of the International Zeolite Association for a detailed explanation on intergrown molecular sieve phases.

The molecular sieves described herein are disordered planar intergrowths of end-member structures ERI and LEV. Both of these two framework types belong to the group that has double 6-rings (d6r) as secondary building units. Intergrown ERI/LEV molecular sieves comprise regions of ERI framework type sequences and regions of LEV framework type sequences. Each change from an ERI to an LEV framework type sequence results in a stacking fault.

In preparing molecular sieve SSZ-105, an N,N-dimethylpiperidinium cation is used as a structure directing agent ("SDA"), also known as a crystallization template. The SDA useful for making SSZ-105 has the following structure (1):

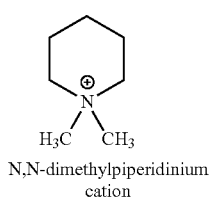

(1)

N,N-dimethylpiperidinium cation

The SDA cation is associated with anions which may be any anion that is not detrimental to the formation of SSZ-105. Representative anions include elements from Group 17 of the Periodic Table (e.g., fluoride, chloride, bromide and iodide), hydroxide, sulfate, tetrafluoroboroate, acetate, carboxylate, and the like.

Reaction Mixture

In general, molecular sieve SSZ-105 is prepared by: (a) preparing a reaction mixture containing (1) at least one source of silicon oxide; (2) at least one source of aluminum oxide; (3) at least one source of a Group 1 metal (M), wherein M is selected from the group consisting of potassium and combinations of sodium and potassium; (4) hydroxide ions; (5) N,N-dimethylpiperidinium cations; and (6) water; and (b) subjecting the reaction mixture to crystallization conditions sufficient to form crystals of the molecular sieve.

The composition of the reaction mixture from which the molecular sieve is formed, in terms of mole ratios, is identified in Table 1 below:

TABLE 1

| Components | Broad | Exemplary |
|---|---|---|
| $SiO_2/Al_2O_3$ | 10 to 100 | 15 to 80 |
| $M/SiO_2$ | 0.05 to 1.00 | 0.10 to 0.30 |
| $Q/SiO_2$ | 0.05 to 0.70 | 0.20 to 0.45 |
| $OH/SiO_2$ | 0.10 to 1.00 | 0.30 to 0.80 |
| $H_2O/SiO_2$ | 10 to 100 | 15 to 60 | wherein compositional variables M and Q are as described herein above.

Sources useful herein for silicon oxide include fumed silica, precipitated silicates, silica hydrogel, silicic acid, colloidal silica, tetra-alkyl orthosilicates (e.g., tetraethyl orthosilicate), and silica hydroxides.

Sources useful herein for aluminum oxide include aluminates, alumina, and aluminum compounds (e.g., aluminum chloride, aluminum hydroxide, and aluminum sulfate), kaolin clays, and other zeolites (e.g., zeolite Y).

In the present synthesis method, the Group 1 metal (M) is selected from the group consisting of potassium and combinations of sodium and potassium. The sodium source may be sodium hydroxide. The potassium source may be potassium hydroxide. In embodiments when the Group 1 metal (M) is a mixture of sodium and potassium, the molar ratio of sodium ($m_1$) divided by the molar ratio of potassium ($m_2$) in the reaction mixture is less than or equal to 2.0; or less than or equal to 1.0; preferably, in the range from 0.1 to 2.0; and conveniently, in the range from 0.1 to 0.5.

Optionally, the reaction mixture may also include seeds of a molecular sieve material, such as SSZ-105 crystals from a previous synthesis, in an amount of from 0.1 to 10 wt. % or from 0.5 to 5 wt. % of the reaction mixture.

For each embodiment described herein, the molecular sieve reaction mixture can be supplied by more than one source. Also, two or more reaction components can be provided by one source.

The reaction mixture can be prepared either batch wise or continuously. Crystal size, morphology and crystallization time of the molecular sieve described herein can vary with the nature of the reaction mixture and the crystallization conditions.

Crystallization and Post-Synthesis Treatment

Crystallization of the molecular sieve disclosed herein can be carried out under either static, tumbled or stirred conditions in a suitable reactor vessel, such as for example polypropylene jars or Teflon-lined or stainless steel autoclaves, at a temperature of from 125° C. to 200° C. (e.g., from 140° C. to 180° C.) for a time sufficient for crystallization to occur at the temperature used, e.g., from 1 day to 28 days.

Once the molecular sieve crystals have formed, the solid product is separated from the reaction mixture by standard mechanical separation techniques such as centrifugation or filtration. The crystals are water-washed and then dried to obtain the as-synthesized molecular sieve crystals. The drying step is typically performed at a temperature of less than 200° C.

As a result of the crystallization process, the recovered crystalline molecular sieve product contains within its pore structure at least a portion of the structure directing agent used in the synthesis.

The structure directing agent is typically at least partially removed from the molecular sieve by calcination before use. Calcination consists essentially of heating the molecular sieve comprising the structure directing agent at a temperature of from 200° C. to 800° C. in the presence of an oxygen-containing gas, optionally in the presence of steam. The structure directing agent can also be removed by photolysis techniques as described in U.S. Pat. No. 6,960,327.

To the extent desired and depending on the composition of the molecular sieve, any cations in the as-synthesized or calcined molecular sieve can be replaced in accordance with techniques well known in the art by ion exchange with other cations. Preferred replacing cations include metal ions, hydrogen ions, hydrogen precursor, e.g., ammonium ions and mixtures thereof. Particularly preferred cations are those which tailor the catalytic activity for certain organic conversion reactions. These include hydrogen, rare earth metals and metals of Groups 2 to 15 of the Periodic Table of the Elements. As used herein, the term "as-synthesized" refers to the molecular sieve in its form after crystallization, prior to removal of the SDA cation.

The molecular sieve disclosed herein can be formulated with into a catalyst composition by combination with other materials, such as binders and/or matrix materials, which provide additional hardness or catalytic activity to the finished catalyst. When blended with such components, the relative proportions of the SSZ-105 molecular sieve and matrix may vary widely with the SSZ-105 content ranging from 1 to 99 wt. % (e.g., from 10 to 90 wt. % or from 20 to 80 wt. %) of the total catalyst.

Characterization of the Molecular Sieve

Molecular sieve SSZ-105 is an intergrowth of the ERI and LEV crystal structures. Physical mixtures of the two phases ERI and LEV prepared by mixing samples of two pure materials are not defined as molecular sieve SSZ-105.

In its as-synthesized and anhydrous form, molecular sieve SSZ-105 has a chemical composition, in terms of mole ratios, as described in Table 2:

TABLE 2

|  | Broad | Exemplary |
|---|---|---|
| $SiO_2/Al_2O_3$ | 10 to 50 | 15 to 40 |
| $Q/SiO_2$ | 0.02 to 0.20 | 0.05 to 0.20 |
| $M/SiO_2$ | 0.01 to 0.20 | 0.02 to 0.15 | wherein compositional variables Q and M are as described herein above.

It should be noted that the as-synthesized form of the molecular sieve disclosed herein may have molar ratios different from the molar ratios of reactants of the reaction mixture used to prepare the as-synthesized form. This result may occur due to incomplete incorporation of 100% of the reactants of the reaction mixture into the crystals formed (from the reaction mixture).

In its calcined form, molecular sieve SSZ-105 has chemical composition comprising the following molar relationship:

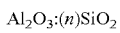

$Al_2O_3:(n)SiO_2$ wherein n has a value of at least 10 (e.g., from 10 to 50, from 10 to 45, from 10 to 40, from 10 to 35, from 10 to 30, from 10 to 25, from 12 to 50, from 12 to 45, from 12 to 40, from 12 to 35, from 12 to 30, from 12 to 25, from 15 to 50, from 15 to 45, from 15 to 40, from 15 to 35, from 15 to 30, or from 15 to 25).

In one embodiment, the intergrown crystalline molecular sieve disclosed herein can have from 1% to 99% (e.g., from 5% to 95%, from 10% to 90%, from 20% to 80%, from 30% to 70%, from 40% to 60%) of the ERI crystal structure. Similarly, the intergrown molecular sieve disclosed herein can have from 1% to 99% (e.g., from 5% to 95%, from 10% to 90%, from 20% to 80%, from 30% to 70%, or from 40% to 60%) of the LEV crystal structure. The relative proportions of each of the phases can be analyzed by X-ray diffraction and, in particular, by comparing the observed patterns with calculated patterns generated using algorithms to simulate the effects of stacking disorder. DIFFaX is a computer program based on a mathematical model for calculating intensities from faults (see M. M. J. Treacy et al., *Proc. R. Soc. Lond. A* 1991, 433, 499-520). DIFFaX is the simulation program selected by and available from the International Zeolite Association to simulate the powder XRD patterns for randomly intergrown phases (see "*Collection of Simulated XRD Powder Patterns for Zeolites*," Fifth Revised Edition, Elsevier, 2007).

The powder X-ray diffraction patterns presented herein were collected by standard techniques. The radiation was $CuK_\alpha$ radiation. The peak heights and the positions, as a function of 2θ where θ is the Bragg angle, were read from the relative intensities of the peaks (adjusting for background), and d, the interplanar spacing corresponding to the recorded lines, can be calculated.

Minor variations in the diffraction pattern can result from variations in the mole ratios of the framework species of the particular sample due to changes in lattice constants. In addition, sufficiently small crystals will affect the shape and intensity of peaks, leading to significant peak broadening. Minor variations in the diffraction pattern can also result from variations in the organic compound used in the preparation. Calcination can also cause minor shifts in the XRD pattern. Notwithstanding these minor perturbations, the basic crystal lattice structure remains unchanged.

Processes Using SSZ-105

Molecular sieve SSZ-105 can be used to dry gases and liquids; for selective molecular separation based on size and polar properties; as an ion-exchanger; as a chemical carrier; in gas chromatography; and as a catalyst in organic conversion reactions. Examples of suitable catalytic uses include catalytic conversion of oxygenates to one or more olefins, synthesis of monoalkylamines and dialkylamines, and catalytic reduction of nitrogen oxides.

EXAMPLES

The following illustrative examples are intended to be non-limiting.

Example 1

0.80 g of 45% KOH solution, 0.13 g of 50% NaOH solution, 9.56 g of deionized water and 2.00 g of CBV760

Y-zeolite powder (Zeolyst International, $SiO_2/Al_2O_3$ mole ratio=60) were mixed together in a Teflon liner. Then, 8.45 g of 20% N,N-dimethylpiperidinium hydroxide solution was added to the mixture. The resulting gel was stirred until it became homogeneous. The liner was then capped and placed within a Parr steel autoclave reactor. The autoclave was then placed in an oven and the heated at 150° C. for 4 days. The solid products were recovered by centrifugation, washed with deionized water and dried at 95° C.

The resulting product had a $SiO_2/Al_2O_3$ mole ratio of 15.8, as determined by ICP elemental analysis.

Figure 2:
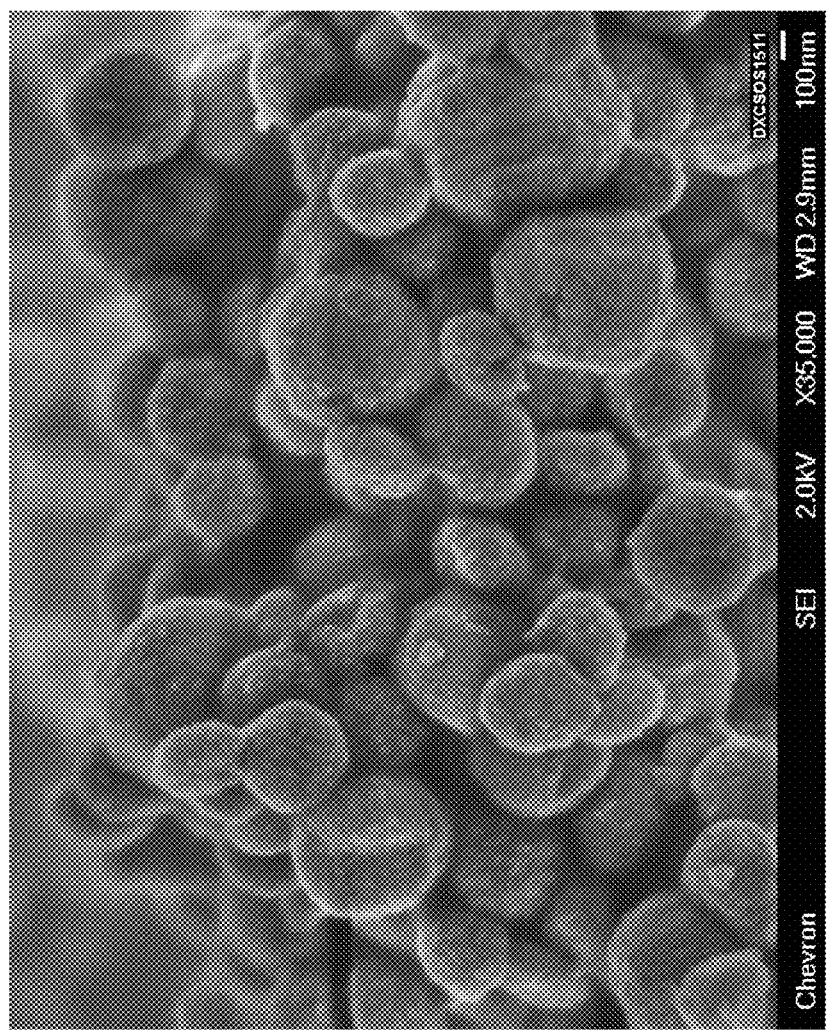
FIG. 2 is a Scanning Electron Micrograph (SEM) image of the as-synthesized molecular sieve prepared in Example 1.

The resulting product was analyzed by powder XRD and SEM. The powder XRD pattern is shown in FIG. 1. The SEM image is shown in FIG. 2 and indicates a uniform field of crystals. The list of the characteristic XRD peaks for this as-synthesized product is shown in Table 3 below.

TABLE 3

Characteristic Peaks for As-Synthesized SSZ-105 Prepared in Example 1

| 2-Theta[a] | d-Spacing, nm | Relative Intensity[b] |
|---|---|---|
| 7.86 | 1.124 | S |
| 11.00 | 0.804 | S |
| 11.76 | 0.752 | W |
| 13.54 | 0.654 | M |
| 15.64 | 0.566 | W |
| 17.49 | 0.507 | S |
| 17.94 | 0.494 | S |
| 20.72 | 0.428 | M |
| 22.10 | 0.402 | VS |
| 23.54 | 0.378 | S |

[a]±0.35
[b]The powder XRD patterns provided are based on a relative intensity scale in which the strongest line in the powder X-ray diffraction pattern is assigned a value of 100: W = weak (>0 to ≤20); M = medium (>20 to ≤40); S = strong (>40 to ≤60); VS = very strong (>60 to ≤100).

Figure 3:
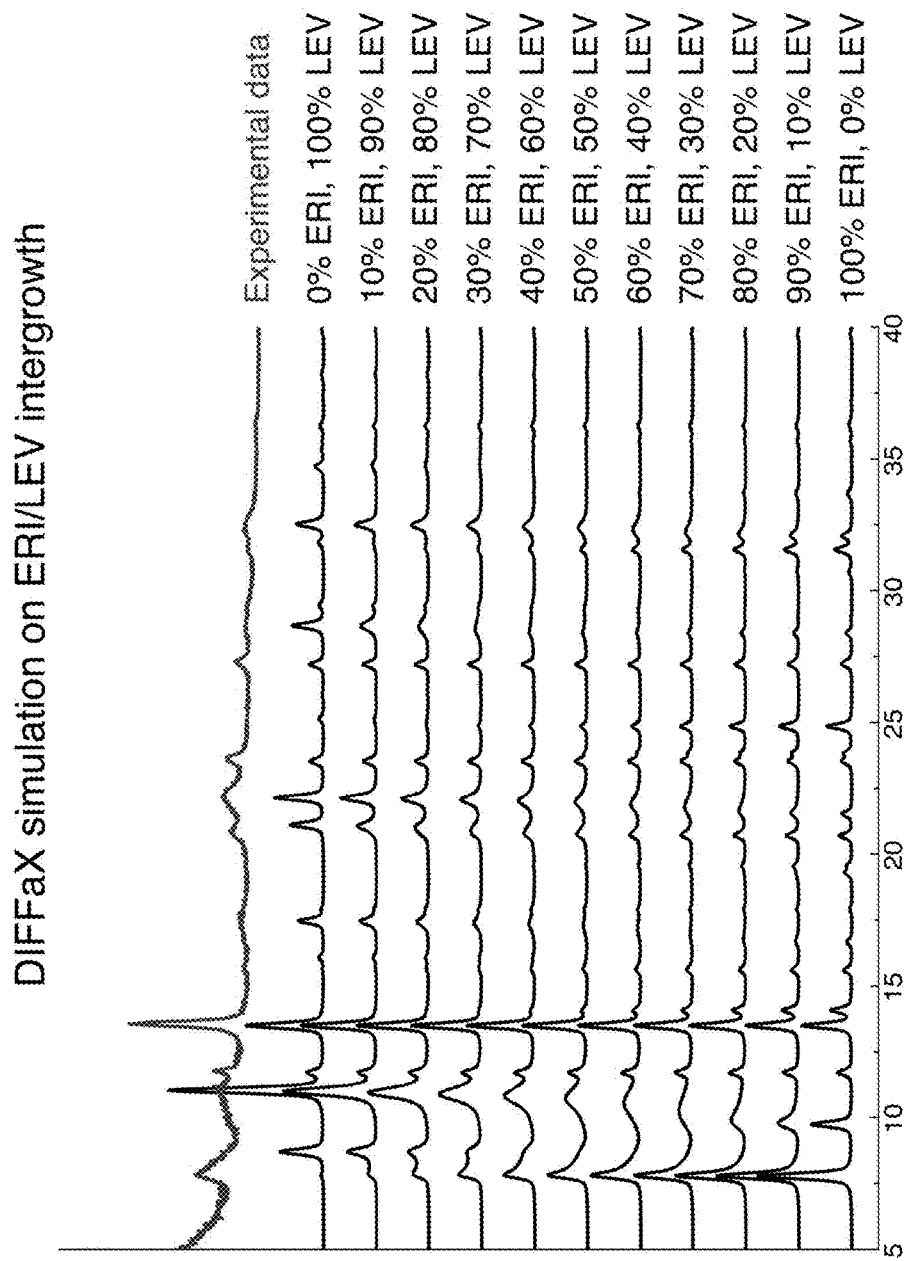
FIG. 3 is a plot of several DIFFaX-generated simulated XRD patterns and a powder XRD pattern of the calcined form of the molecular sieve prepared in Example 1.

A comparison between the experimental powder XRD pattern collected from the calcined product and DIFFaX simulated powder XRD patterns with various ERI/LEV intergrowth ratios is shown in FIG. 3. DIFFaX calculation indicates that the product is an intergrowth material with approximately 50-60% of ERI stacking sequence and 40-50% LEV stacking sequence.

Example 2

3.21 g of 45% KOH solution, 0.52 g of 50% NaOH solution, 32.46 g of deionized water and 8.00 g of CBV780 Y-zeolite powder (Zeolyst International, $SiO_2/Al_2O_3$ mole ratio=80) were mixed together in a Teflon liner. Then, 41.05 g of 20% N,N-dimethylpiperidinium hydroxide solution was added to the mixture. The resulting gel was stirred until it became homogeneous. The liner was then capped and placed within a Parr steel autoclave reactor. The autoclave was then placed in an oven and the heated at 150° C. for 3 days. The solid products were recovered by centrifugation, washed with deionized water and dried at 95° C.

The resulting product had a $SiO_2/Al_2O_3$ mole ratio of 17.1, as determined by ICP elemental analysis.

Figure 4:
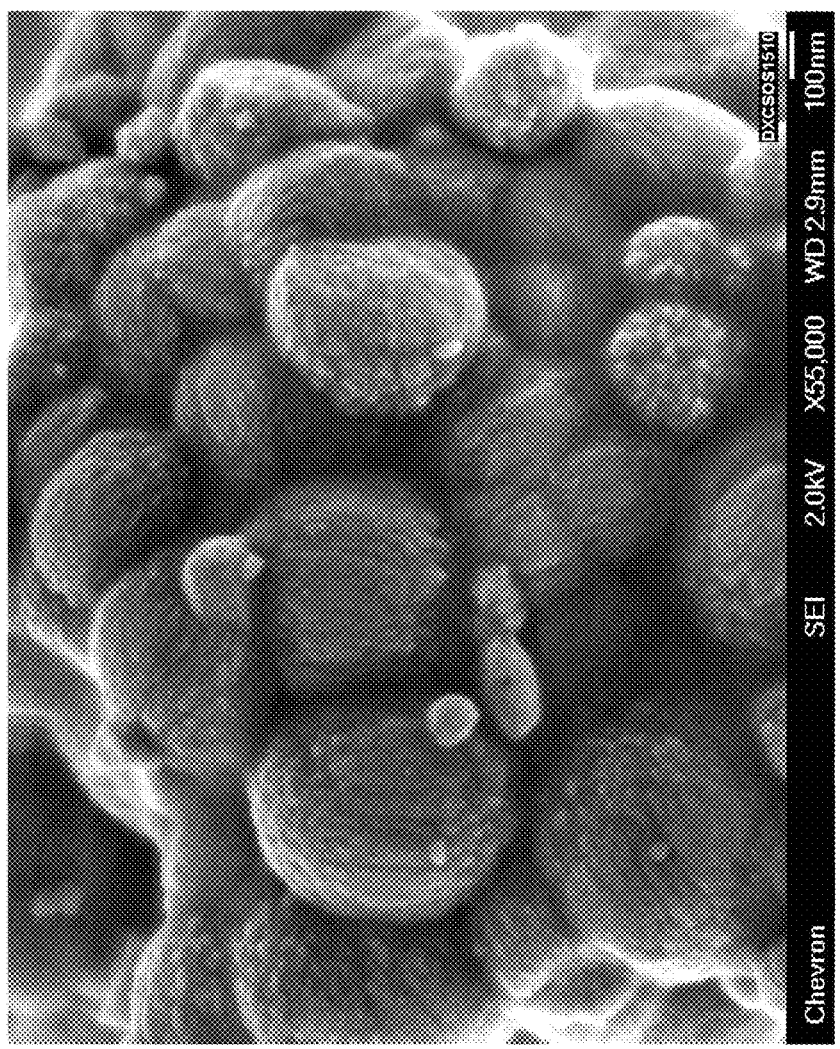
FIG. 4 is a SEM image of the as-synthesized molecular sieve prepared in Example 2.

The resulting product was identified by powder XRD and SEM as pure SSZ-105. The SEM image is shown in FIG. 4. The list of the characteristic XRD peaks for this as-synthesized product is shown in Table 4 below.

TABLE 4

Characteristic Peaks for As-Synthesized SSZ-105 Prepared in Example 2

| 2-Theta[a] | d-Spacing, nm | Relative Intensity[b] |
|---|---|---|
| 7.90 | 1.118 | S |
| 11.00 | 0.804 | S |
| 11.73 | 0.754 | W |
| 13.51 | 0.655 | W |
| 15.78 | 0.561 | W |
| 17.48 | 0.507 | S |
| 17.90 | 0.495 | M |
| 20.86 | 0.425 | M |
| 22.28 | 0.399 | VS |
| 23.52 | 0.378 | M |

[a]±0.35
[b]The powder XRD patterns provided are based on a relative intensity scale in which the strongest line in the powder X-ray diffraction pattern is assigned a value of 100: W = weak (>0 to ≤20); M = medium (>20 to ≤40); S = strong (>40 to ≤60); VS = very strong (>60 to ≤100).

Figure 5:
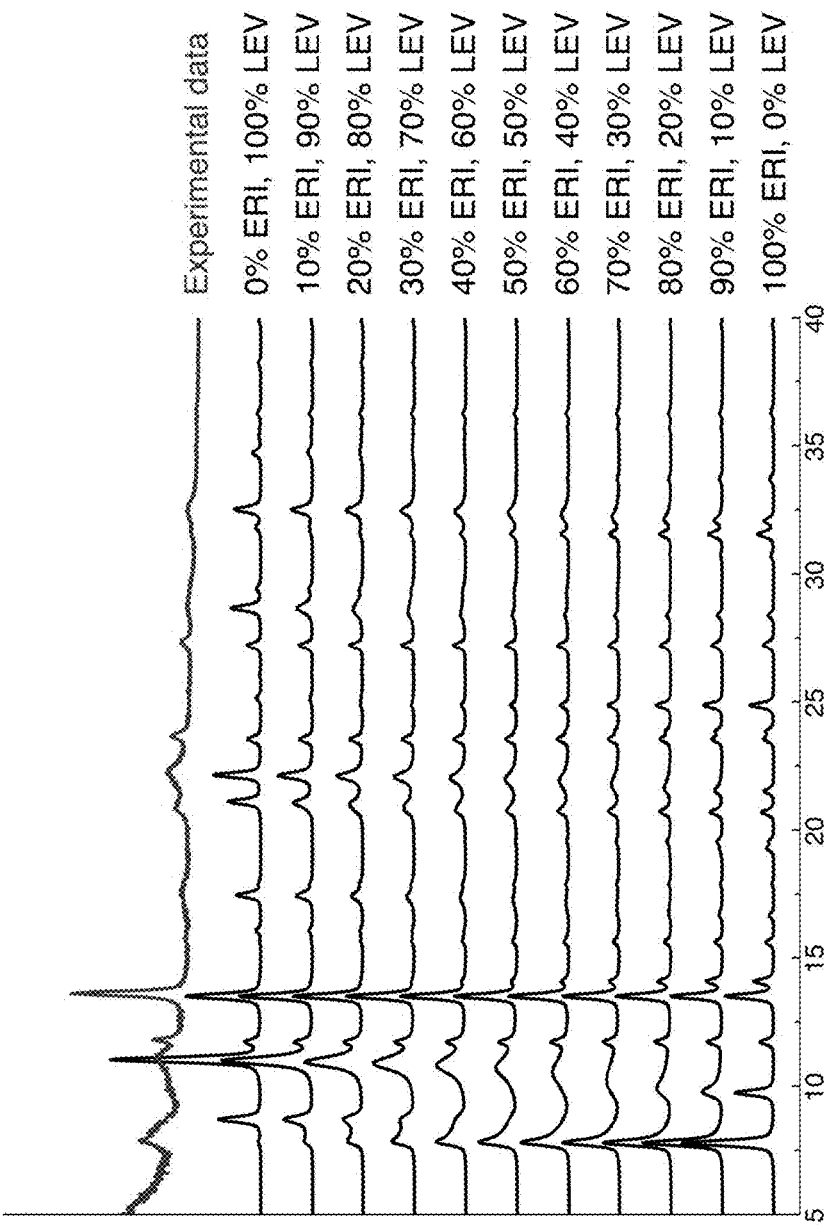
FIG. 5 is a plot of several DIFFaX-generated simulated XRD patterns and a powder XRD pattern of the calcined form of the molecular sieve prepared in Example 2.

A comparison between the experimental powder XRD pattern collected from the calcined product and DIFFaX simulated powder XRD patterns with various ERI/LEV intergrowth ratios is shown in FIG. 5. DIFFaX calculation indicates that the product is an intergrowth material with approximately 50-60% of ERI stacking sequence and 40-50% LEV stacking sequence.

Example 3

0.80 g of 45% KOH solution, 0.13 g of 50% NaOH solution, 9.56 g of deionized water and 2.00 g of CBV720 Y-zeolite powder (Zeolyst International, $SiO_2/Al_2O_3$ mole ratio=30) were mixed together in a Teflon liner. Then, 8.45 g of 20% N,N-dimethylpiperidinium hydroxide solution was added to the mixture. The resulting gel was stirred until it became homogeneous. The liner was then capped and placed within a Parr steel autoclave reactor. The autoclave was then placed in an oven and the heated at 150° C. for 4 days. The solid products were recovered by centrifugation, washed with deionized water and dried at 95° C.

The resulting product had a $SiO_2/Al_2O_3$ mole ratio of 12.7, as determined by ICP elemental analysis.

Figure 6:
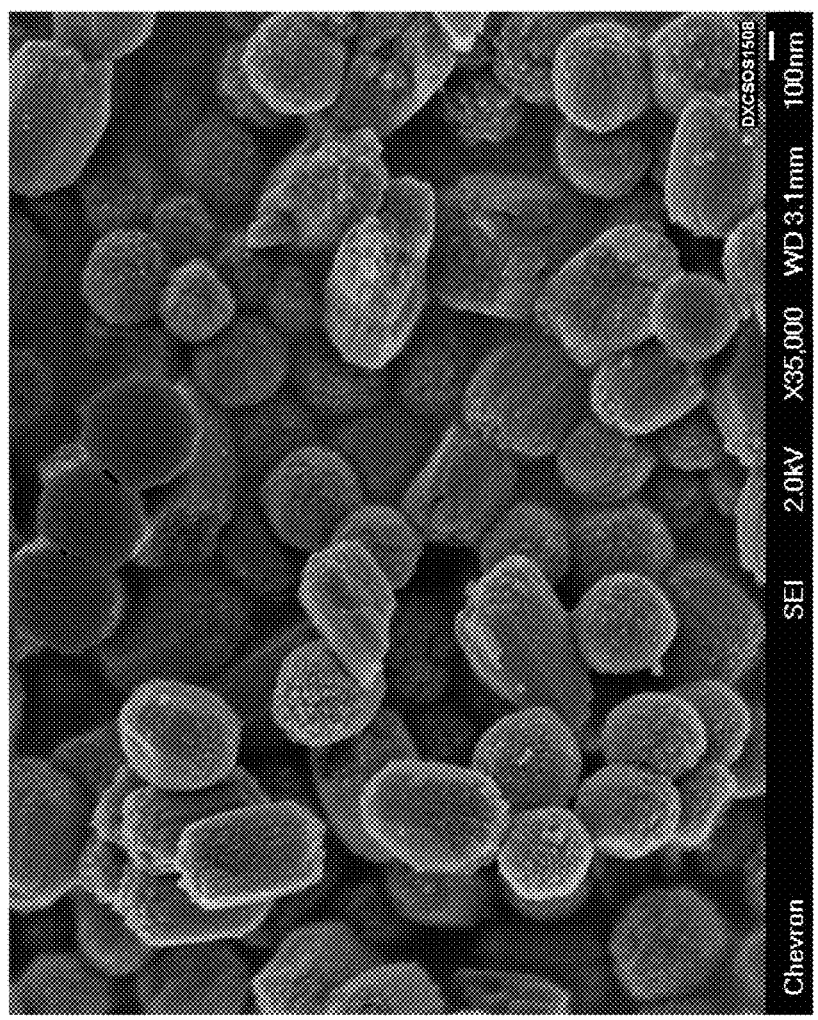
FIG. 6 is a SEM image of the as-synthesized molecular sieve prepared in Example 3.

The resulting product was identified by powder XRD and SEM as pure SSZ-105. The SEM image is shown in FIG. 6. The list of the characteristic XRD peaks for this as-synthesized product is shown in Table 5 below.

TABLE 5

Characteristic Peaks for As-Synthesized SSZ-105 Prepared in Example 3

| 2-Theta[a] | d-Spacing, nm | Relative Intensity[b] |
|---|---|---|
| 7.80 | 1.132 | VS |
| 9.80 | 0.902 | M |
| 11.76 | 0.752 | W |
| 13.47 | 0.657 | S |
| 15.56 | 0.569 | M |
| 16.68 | 0.531 | W |
| 17.90 | 0.495 | W |
| 19.36 | 0.458 | S |
| 20.65 | 0.430 | M |
| 21.45 | 0.414 | W |

[a]±0.35
[b]The powder XRD patterns provided are based on a relative intensity scale in which the strongest line in the powder X-ray diffraction pattern is assigned a value of 100: W = weak (>0 to ≤20); M = medium (>20 to ≤40); S = strong (>40 to ≤60); VS = very strong (>60 to ≤100).

Figure 7:
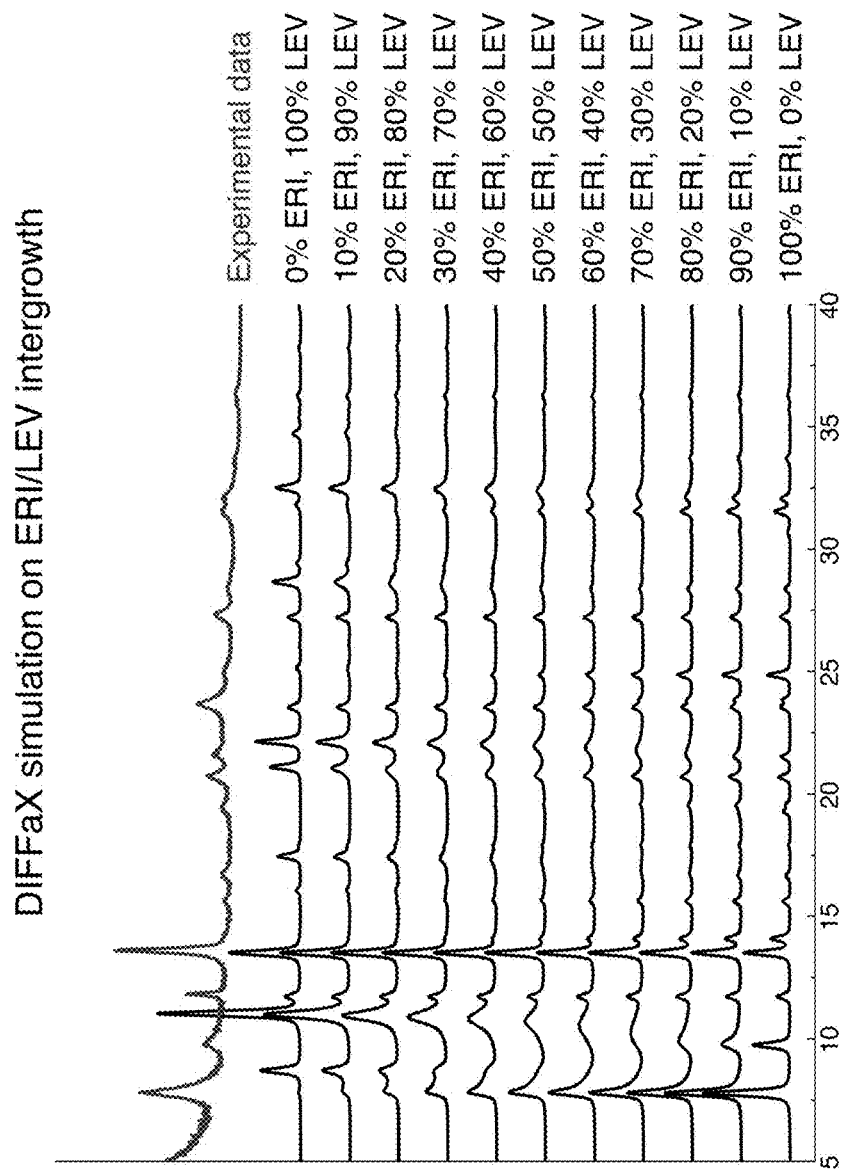
FIG. 7 is a plot of several DIFFaX-generated simulated XRD patterns and a powder XRD pattern of the calcined form of the molecular sieve prepared in Example 3.

A comparison between the experimental powder XRD pattern collected from the calcined product and DIFFaX simulated powder XRD patterns with various ERI/LEV intergrowth ratios is shown in FIG. 7. DIFFaX calculation indicates that the product is an intergrowth material with approximately 80-90% of ERI stacking sequence and 10-20% LEV stacking sequence.

Example 4

3.21 g of 45% KOH solution, 32.72 g of deionized water and 8.00 g of CBV760 Y-zeolite powder (Zeolyst International, $SiO_2/Al_2O_3$ mole ratio=60) were mixed together in a Teflon liner. Then, 41.05 g of 20% N,N-dimethylpiperidinium hydroxide solution was added to the mixture. The resulting gel was stirred until it became homogeneous. The liner was then capped and placed within a Parr steel autoclave reactor. The autoclave was then placed in an oven and the heated at 150° C. for 3 days. The solid products were recovered by centrifugation, washed with deionized water and dried at 95° C.

The resulting product had a $SiO_2/Al_2O_3$ mole ratio of 19.7, as determined by ICP elemental analysis.

Figure 8:
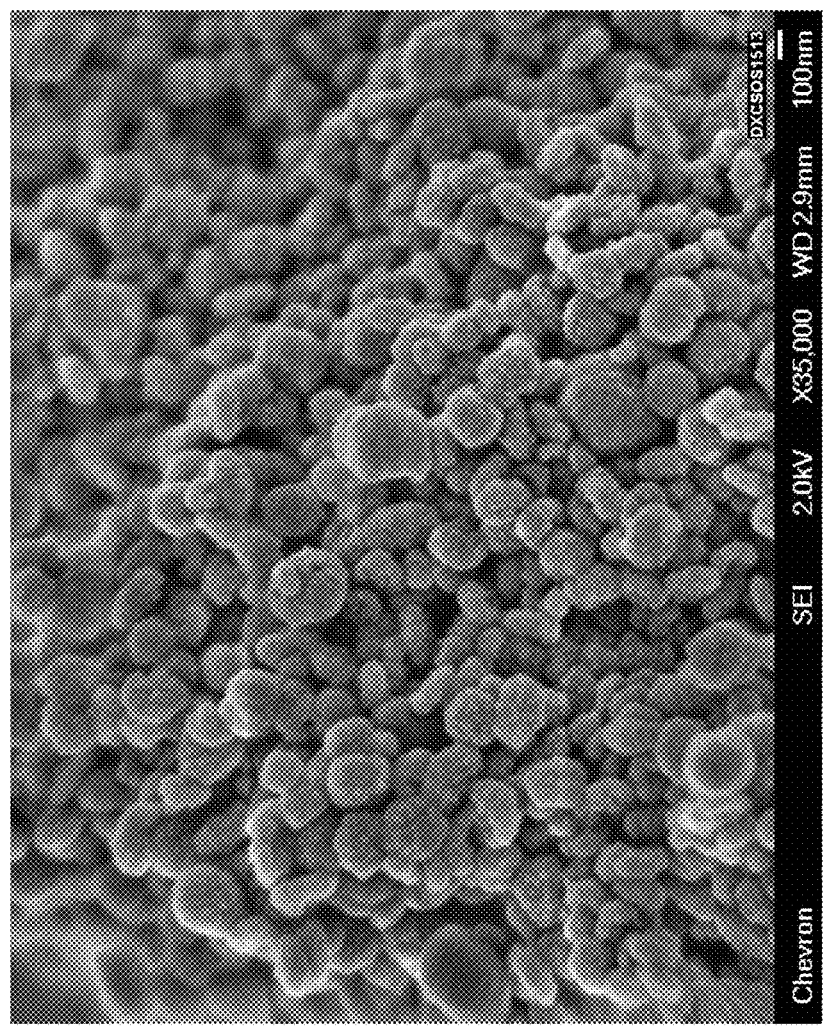
FIG. 8 is a SEM image of the as-synthesized molecular sieve prepared in Example 4.

The resulting product was analyzed by powder XRD and SEM. It was identified as pure SSZ-105 molecular sieve. The SEM image is shown in FIG. 8. The list of the characteristic XRD peaks for this as-synthesized product is shown in Table 6 below.

TABLE 6

Characteristic Peaks for As-Synthesized SSZ-105 Prepared in Example 4.

| 2-Theta[a] | d-Spacing, nm | Relative Intensity[b] |
| --- | --- | --- |
| 7.84 | 1.126 | W |
| 8.62 | 1.025 | W |
| 10.92 | 0.809 | S |
| 11.73 | 0.754 | W |
| 13.55 | 0.653 | S |
| 15.69 | 0.564 | W |
| 17.56 | 0.505 | VS |
| 17.92 | 0.495 | S |
| 21.06 | 0.421 | M |
| 22.28 | 0.399 | VS |

[a]±0.35
[b]The powder XRD patterns provided are based on a relative intensity scale in which the strongest line in the powder X-ray diffraction pattern is assigned a value of 100: W = weak (>0 to ≤20); M = medium (>20 to ≤40); S = strong (>40 to ≤60); VS = very strong (>60 to ≤100).

Figure 9:
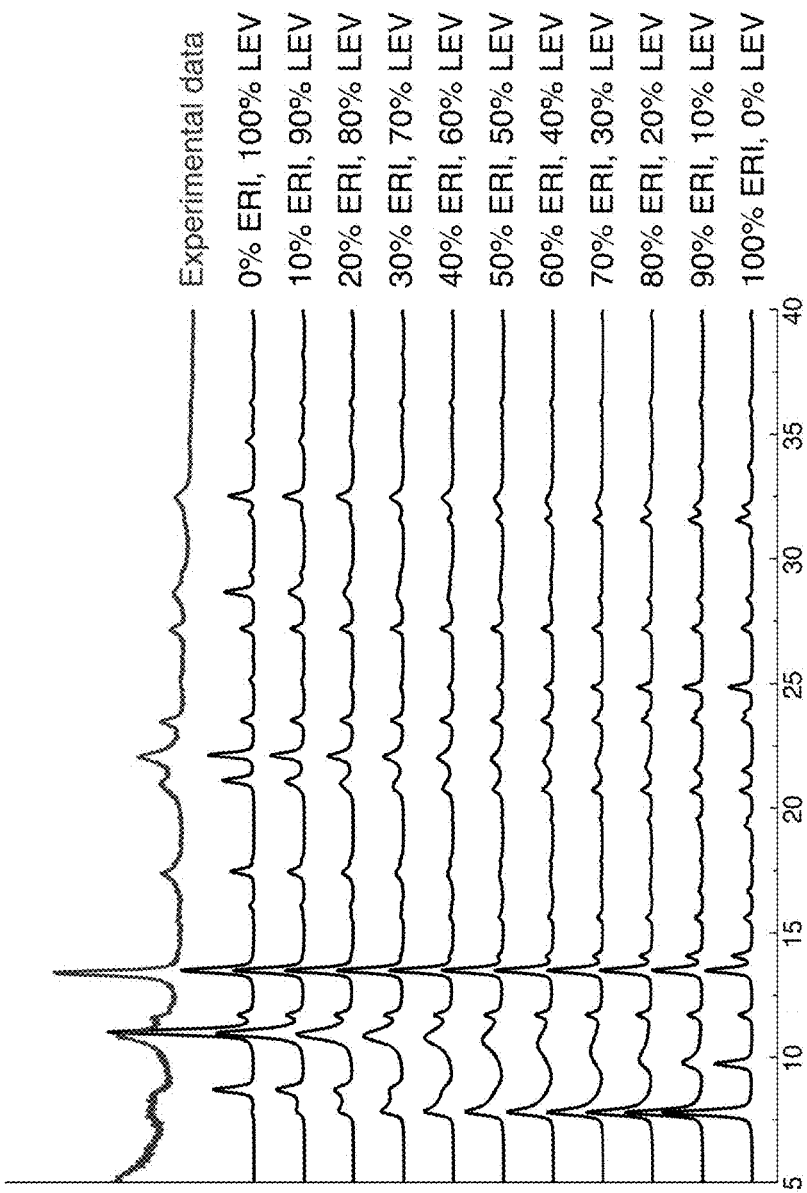
FIG. 9 is a plot of several DIFFaX-generated simulated XRD patterns and a powder XRD pattern of the calcined form of the molecular sieve prepared in Example 4.

A comparison between the experimental powder XRD pattern collected from the calcined product and DIFFaX simulated powder XRD patterns with various ERI/LEV intergrowth ratios is shown in FIG. 9. DIFFaX calculation indicates that the product is an intergrowth material with approximately 20-30% of ERI stacking sequence and 70-80% LEV stacking sequence.

Example 5

0.80 g of 45% KOH solution, 8.18 g of deionized water and 2.00 g of CBV780 Y-zeolite powder (Zeolyst International, $SiO_2/Al_2O_3$ mole ratio=80) were mixed together in a Teflon liner. Then, 10.26 g of 20% N,N-dimethylpiperidinium hydroxide solution was added to the mixture. The resulting gel was stirred until it became homogeneous. The liner was then capped and placed within a Parr steel autoclave reactor. The autoclave was then placed in an oven and the heated at 150° C. for 4 days. The solid products were recovered by centrifugation, washed with deionized water and dried at 95° C.

The resulting product had a $SiO_2/Al_2O_3$ mole ratio of 21.6, as determined by ICP elemental analysis.

Figure 10:
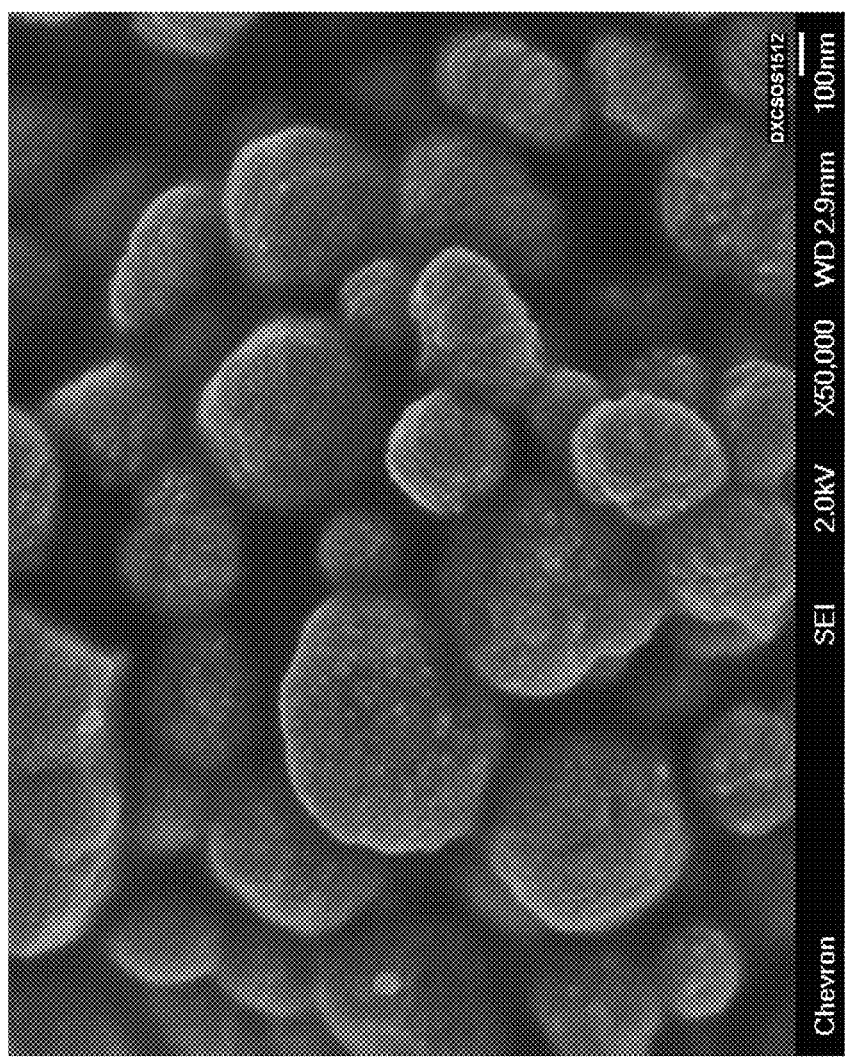
FIG. 10 is a SEM image of the as-synthesized molecular sieve prepared in Example 5.

The resulting product was analyzed by powder XRD and SEM and indicated that the product was pure SSZ-105 molecular sieve. The SEM image is shown in FIG. 10. The list of the characteristic XRD peaks for this as-synthesized product is shown in Table 7 below.

TABLE 7

Characteristic Peaks for As-Synthesized SSZ-105 Prepared in Example 5

| 2-Theta[a] | d-Spacing, nm | Relative Intensity[b] |
| --- | --- | --- |
| 7.95 | 1.111 | W |
| 8.63 | 1.024 | W |
| 10.97 | 0.806 | M |
| 11.62 | 0.761 | W |
| 13.54 | 0.654 | M |
| 16.00 | 0.554 | W |
| 17.46 | 0.507 | VS |
| 17.88 | 0.496 | M |
| 21.06 | 0.421 | S |
| 22.22 | 0.400 | VS |

[a]±0.35
[b]The powder XRD patterns provided are based on a relative intensity scale in which the strongest line in the powder X-ray diffraction pattern is assigned a value of 100: W = weak (>0 to ≤20); M = medium (>20 to ≤40); S = strong (>40 to ≤60); VS = very strong (>60 to ≤100).

Figure 11:
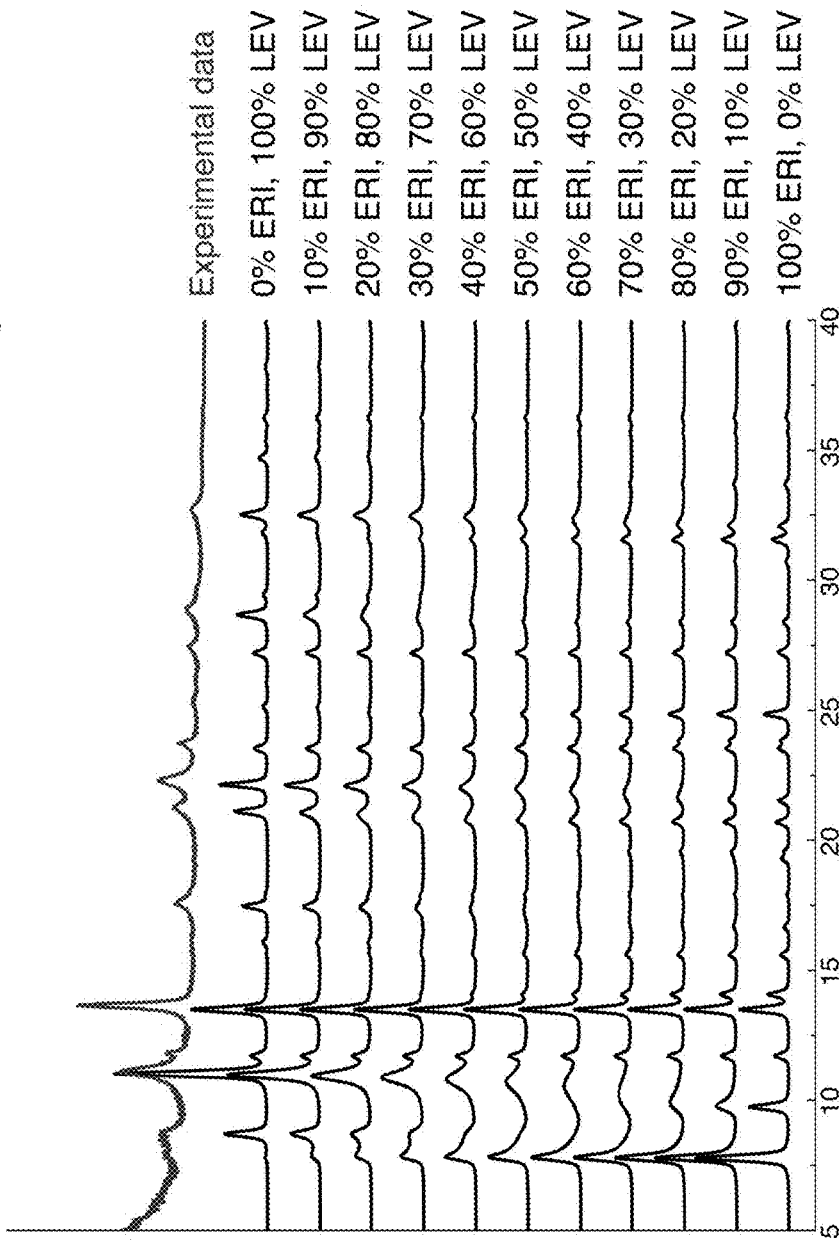
FIG. 11 is a plot of several DIFFaX-generated simulated XRD patterns and a powder XRD pattern of the calcined form of the molecular sieve prepared in Example 5.

A comparison between the experimental powder XRD pattern collected from the calcined product and DIFFaX simulated powder XRD patterns with various ERI/LEV intergrowth ratios is shown in FIG. 11. DIFFaX calculation indicates that the product is an intergrowth material with approximately 10-20% of ERI stacking sequence and 80-90% LEV stacking sequence.

Example 6

Calcination of SSZ-105

The as-synthesized molecular sieve products were calcined inside a muffle furnace under a flow of air heated to 540° C. at a rate of 1° C./minute and held at 540° C. for 5 hours, cooled and then analyzed by powder XRD.

FIG. 3, FIG. 5, FIG. 7, FIG. 9 and FIG. 11 show the XRD patterns of calcined SSZ-105 molecular sieve products 1, 2, 3, 4 and 5, respectively, and indicate that the material remains stable after calcination to remove the organic SDA.

Example 7

Micropore Volume Analysis

The calcined material from Example 6 was treated with 10 mL (per g of molecular sieve) of a 1N ammonium nitrate solution at 90° C. for 2 hours. The solution was cooled, decanted off and same process repeated.

The ammonium-exchanged molecular sieve product ($NH_4$-SSZ-105) was subjected to a micropore volume analysis using $N_2$ as adsorbate and via the BET method. The molecular sieve exhibited a micropore volume of 0.25 $cm^3/g$ and indicates that SSZ-105 has microporous character.

As used herein, the term "comprising" means including elements or steps that are identified following that term, but any such elements or steps are not exhaustive, and an embodiment can include other elements or steps.

Unless otherwise specified, the recitation of a genus of elements, materials or other components, from which an individual component or mixture of components can be selected, is intended to include all possible sub-generic combinations of the listed components and mixtures thereof.

All documents cited in this application are herein incorporated by reference in their entirety to the extent such disclosure is not inconsistent with this text.

The invention claimed is:

1. A method for preparing an aluminosilicate molecular sieve composition comprising at least one intergrown phase comprising an ERI framework type molecular sieve and an LEV framework type molecular sieve, the method comprising:
    (a) preparing a reaction mixture containing:
        (1) at least one source of silicon oxide;
        (2) at least one source of aluminum oxide;
        (3) at least one source of a Group 1 metal (M), wherein M is selected from the group consisting of potassium and combinations of sodium and potassium;
        (4) hydroxide ions;
        (5) N,N-dimethylpiperidinium cations (Q); and
        (6) water; and
    (b) subjecting the reaction mixture to crystallization conditions sufficient to form crystals of the molecular sieve composition.

2. The method of claim 1, wherein the molecular sieve composition is prepared from a reaction mixture comprising, in terms of mole ratios, the following:

| | |
|---|---|
| $SiO_2/Al_2O_3$ | 10 to 100 |
| $M/SiO_2$ | 0.05 to 1.00 |
| $Q/SiO_2$ | 0.05 to 0.70 |
| $OH/SiO_2$ | 0.10 to 1.00 |
| $H_2O/SiO_2$ | 10 to 100. |

3. The method of claim 1, wherein the molecular sieve composition is prepared from a reaction mixture comprising, in terms of mole ratios, the following:

| | |
|---|---|
| $SiO_2/Al_2O_3$ | 15 to 80 |
| $M/SiO_2$ | 0.10 to 0.30 |
| $Q/SiO_2$ | 0.20 to 0.45 |
| $OH/SiO_2$ | 0.30 to 0.80 |
| $H_2O/SiO_2$ | 15 to 60. |

4. The method of claim 1, wherein the crystallization conditions include a temperature of from 125° C. to 200° C.

5. The method of claim 1, wherein the ERI framework type molecular sieve is present in the at least one intergrown phase in a proportion to the LEV framework type molecular sieve of from 5% to 95%.

6. The method of claim 1, wherein the molecular sieve has, in its as-synthesized and anhydrous form, a composition, in terms of mole ratios, as follows:

| | |
|---|---|
| $SiO_2/Al_2O_3$ | 10 to 50 |
| $Q/SiO_2$ | 0.02 to 0.20 |
| $M/SiO_2$ | 0.01 to 0.20. |

7. The method of claim 1, wherein the molecular sieve has, in its as-synthesized and anhydrous form, a composition, in terms of mole ratios, as follows:

| | |
|---|---|
| $SiO_2/Al_2O_3$ | 15 to 40 |
| $Q/SiO_2$ | 0.05 to 0.20 |
| $M/SiO_2$ | 0.02 to 0.15. |

* * * * *